US012744622B2

(12) United States Patent
Taherzadeh Boroujeni et al.

(10) Patent No.: US 12,744,622 B2
(45) Date of Patent: Sep. 22, 2026

(54) MSG3 REPETITION INDICATION VIA RANDOM ACCESS RESPONSE

(71) Applicant: QUALCOMM Incorporated, San Diego, CA (US)

(72) Inventors: Mahmoud Taherzadeh Boroujeni, San Diego, CA (US); Tao Luo, San Diego, CA (US); Peter Gaal, San Diego, CA (US); Jelena Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 376 days.

(21) Appl. No.: 17/650,319

(22) Filed: Feb. 8, 2022

(65) Prior Publication Data

US 2022/0279589 A1 Sep. 1, 2022

Related U.S. Application Data

(60) Provisional application No. 63/200,179, filed on Feb. 19, 2021.

(51) Int. Cl.
*H04L 1/16* (2023.01)
*H04W 74/00* (2009.01)
(Continued)

(52) U.S. Cl.
CPC ............ *H04L 1/16* (2013.01); *H04W 74/002* (2013.01); *H04W 74/0833* (2013.01); *H04W 74/0838* (2024.01)

(58) Field of Classification Search
CPC ........... H04W 74/0833; H04W 74/008; H04W 74/002; H04W 74/0838; H04L 1/16; H04L 1/0016; H04L 1/08
See application file for complete search history.

(56) References Cited

U.S. PATENT DOCUMENTS 10,666,411 B2 * 5/2020 Blankenship ......... H04L 1/0031
2018/0139720 A1 * 5/2018 Chen .................. H04W 68/025
(Continued)

FOREIGN PATENT DOCUMENTS

CN 115087125 A * 9/2022 ........... H04L 1/0004
CN 116868674 A * 10/2023
(Continued)

OTHER PUBLICATIONS

Alcatel-Lucent, et al., "Coverage Enhancement for RACH Messages", 3GPP TSG-RAN WG1 Meeting #76, R1-140153—Rel-12 MTC—CE for RACH Messages V0.2, 3rd Generation Partnership Project, Mobile Competence Centre, 650, Route Des Lucioles, F-06921 Sophia-Antipolis Cedex, France, vol. RAN WG1, No. Prague, Czech Republic, Feb. 10, 2014-Feb. 14, 2014 Feb. 9, 2014, XP050735716, 5 Pages.
(Continued)

*Primary Examiner* — Shean Tokuta
(74) *Attorney, Agent, or Firm* — QUALCOMM Incorporated

(57) ABSTRACT

Various aspects of the present disclosure generally relate to wireless communication. In some aspects, a user equipment (UE) may transmit a physical random access channel (PRACH) message and receive a random access response (RAR). The UE may transmit the repetitions of the Msg3 based at least in part on an alternative interpretation of one or more bitfields of the RAR. Numerous other aspects are described.

26 Claims, 10 Drawing Sheets

(51) Int. Cl.
*H04W 74/0833* (2024.01)
*H04W 74/0838* (2024.01)

(56) References Cited

U.S. PATENT DOCUMENTS

2021/0337521 A1* 10/2021 Xu ........................ H04W 72/23
2021/0352735 A1* 11/2021 Bae ................... H04W 74/0841
2021/0385856 A1* 12/2021 Irukulapati ........... H04W 72/23
2022/0095304 A1* 3/2022 Muruganathan ....... H04B 7/024
2022/0210806 A1* 6/2022 Rastegardoost ...... H04L 5/0094
2022/0232639 A1* 7/2022 Wang .................... H04L 5/0053
2022/0279589 A1* 9/2022 Taherzadeh Boroujeni ................ H04L 1/16
2022/0304074 A1* 9/2022 He .................... H04W 74/0841
2022/0312413 A1* 9/2022 Cozzo ................... H04L 1/0003
2022/0312475 A1* 9/2022 He ...................... H04W 74/006
2023/0042922 A1* 2/2023 Taherzadeh Boroujeni ................ H04W 74/0833
2023/0188261 A1* 6/2023 Awadin ................. H04L 1/1864 370/329
2023/0276436 A1* 8/2023 Pi ...................... H04W 72/1268 370/329
2023/0361919 A1* 11/2023 Yang ................... H04W 74/004
2024/0129914 A1* 4/2024 Cozzo ............... H04W 72/0453
2024/0306155 A1* 9/2024 Liu ....................... H04W 72/21

FOREIGN PATENT DOCUMENTS

CN 109586878 B * 11/2023 ............ H04W 72/21
CN 115087125 B * 1/2026
EP 3820224 A1 * 5/2021 .......... H04W 72/535
WO WO-2015109512 A1 * 7/2015 ............ H04W 72/23
WO WO-2016114215 A1 * 7/2016 ............ H04W 52/02
WO WO-2016117981 A1 * 7/2016 ........... H04L 1/0029
WO WO-2016120109 A1 * 8/2016 ............... H04L 1/08
WO WO-2016186044 A1 * 11/2016 ............ H04W 72/30
WO WO-2017026514 A1 * 2/2017 ........ H04W 74/0833
WO WO-2019141061 A1 * 7/2019 ............ H04W 72/21
WO WO-2019214650 A1 * 11/2019 .......... H04W 74/006
WO WO-2019216803 A1 * 11/2019 ............ H04W 72/23
WO WO-2020067817 A1 * 4/2020 ............ H04W 72/02
WO WO-2020133036 A1 * 7/2020 ............ H04W 72/23
WO WO-2020144639 A1 * 7/2020 ............ H04W 72/23
WO WO-2020193515 A1 * 10/2020 ............ H04W 72/23
WO WO-2022033274 A1 * 2/2022 ........ H04W 74/0833
WO WO-2022178491 A1 * 8/2022 ........ H04W 74/0833
WO WO-2022188685 A1 * 9/2022 ........... H04L 1/1858

OTHER PUBLICATIONS

CATT: "Discussion on Coverage Enhancement for Channels Other than PUSCH and PUCCH", 3GPP TSG RAN WG1 #103-e, R1-2007876, 3rd Generation Partnership Project, Mobile Competence Centre, 650, Route Des Lucioles, F-06921 Sophia-Antipolis Cedex, France, vol. RAN WG1, No. e-Meeting, Oct. 26, 2020-Nov. 13, 2020 Oct. 17, 2020, XP051939951, 6 Pages.

Huawei, et al., "Msg3 Repetition for Coverage Enhancement", 3GPP TSG RAN WG1 Meeting #104-e, R1-2100197, 3rd Generation Partnership Project, Mobile Competence Centre , 650, Route Des, Lucioles, F-06921 Sophia-Antipolis Cedex, France, vol. RAN WG1, No. e-Meeting, Jan. 25, 2021-Feb. 5, 2021 Jan. 19, 2021, XP051970829, 4 Pages.

International Search Report and Written Opinion—PCT/US2022/070581—ISA/EPO—Jun. 9, 2022.

* cited by examiner

Figure 4:
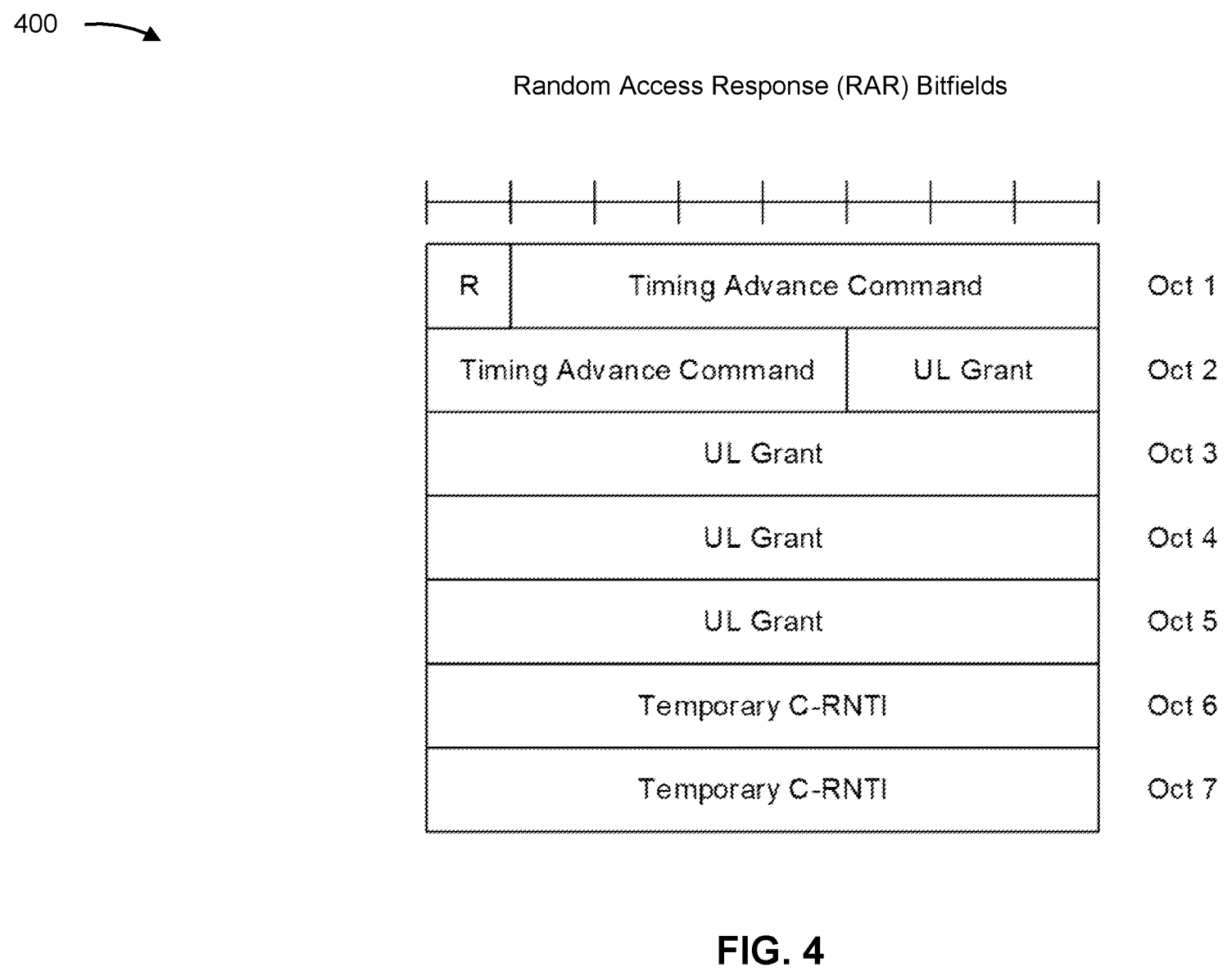

400

Random Access Response (RAR) Bitfields

| Fields | Octet |
| --- | --- |
| R \| Timing Advance Command | Oct 1 |
| Timing Advance Command \| UL Grant | Oct 2 |
| UL Grant | Oct 3 |
| UL Grant | Oct 4 |
| UL Grant | Oct 5 |
| Temporary C-RNTI | Oct 6 |
| Temporary C-RNTI | Oct 7 |

| TPC Command | Value (in dB) | Repetitions |
|---|---|---|
| 0 | -6 | 1 |
| 1 | -4 | 2 |
| 2 | -2 | 4 |
| 3 | 0 | 8 |
| 4 | 2 | |
| 5 | 4 | |
| 6 | 6 | |
| 7 | 8 | |

FIG. 6

700
710
Transmit a physical random access channel (PRACH) message associated with transmitting repetitions of an Msg3 for a RACH procedure
720
Receive a RAR
730
Transmit the repetitions of the Msg3 based at least in part on the alternative interpretation of the one or more bitfields of the RAR

MSG3 REPETITION INDICATION VIA RANDOM ACCESS RESPONSE

CROSS-REFERENCE TO RELATED APPLICATION

This Patent Application claims priority to U.S. Provisional Patent Application No. 63/200,179, filed on Feb. 19, 2021, entitled "MSG3 REPETITION INDICATION VIA RANDOM ACCESS RESPONSE," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for indicating, via a random access response, repetition of a random access channel Msg3.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" or "forward link" refers to the communication link from the BS to the UE, and "uplink" or "reverse link" refers to the communication link from the UE to the BS. As will be described in more detail herein, a BS may be referred to as a Node B, a gNB, an access point (AP), a radio head, a transmit receive point (TRP), a New Radio (NR) BS, or a 5G Node B.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The UE may include a memory and one or more processors coupled to the memory. The one or more processors may be configured to transmit a physical random access channel (PRACH) message associated with transmitting repetitions of an Msg3 for a RACH procedure. The one or more processors may be configured to receive a random access response (RAR). The one or more processors may be configured to transmit the repetitions of the Msg3 based at least in part on an alternative interpretation of one or more bitfields of the RAR.

Some aspects described herein relate to a base station for wireless communication. The base station may include a memory and one or more processors coupled to the memory. The one or more processors may be configured to receive, from a UE, a PRACH message associated with transmitting repetitions of an Msg3 for a RACH procedure. The one or more processors may be configured to transmit an RAR with one or more bitfields of the RAR configured for an alternative interpretation, by the UE, of the one or more bitfields to determine whether to transmit repetitions of the Msg3, based at least in part on receiving the PRACH message. The one or more processors may be configured to receive the repetitions of the Msg3.

Some aspects described herein relate to a method of wireless communication performed by a UE. The method may include transmitting a PRACH message associated with transmitting repetitions of an Msg3 for a RACH procedure. The method may include receiving an RAR. The method may include transmitting the repetitions of the Msg3 based at least in part on an alternative interpretation of one or more bitfields of the RAR.

Some aspects described herein relate to a method of wireless communication performed by a base station. The method may include receiving, from a UE, a PRACH message associated with transmitting repetitions of an Msg3 for a RACH procedure. The method may include transmitting an RAR with one or more bitfields of the RAR configured for an alternative interpretation, by the UE, of the one or more bitfields to determine whether to transmit repetitions of the Msg3, based at least in part on receiving the PRACH message. The method may include receiving the repetitions of the Msg3.

Some aspects described herein relate to a non-transitory computer-readable medium that stores a set of instructions for wireless communication by a UE. The set of instructions, when executed by one or more processors of the UE, may cause the UE to transmit a PRACH message associated with transmitting repetitions of an Msg3 for a RACH procedure. The set of instructions, when executed by one or more processors of the UE, may cause the UE to receive an RAR. The set of instructions, when executed by one or more processors of the UE, may cause the UE to transmit the repetitions of the Msg3 based at least in part on an alternative interpretation of one or more bitfields of the RAR.

Some aspects described herein relate to a non-transitory computer-readable medium that stores a set of instructions for wireless communication by a base station. The set of instructions, when executed by one or more processors of the base station, may cause the base station to receive, from a UE, a PRACH message associated with transmitting repetitions of an Msg3 for a RACH procedure. The set of instructions, when executed by one or more processors of the base station, may cause the base station to transmit an RAR with one or more bitfields of the RAR configured for an alternative interpretation of the one or more bitfields to determine whether to transmit repetitions of the Msg3, based at least in part on receiving the PRACH message. The set of instructions, when executed by one or more processors of the base station, may cause the base station to receive the repetitions of the Msg3.

Some aspects described herein relate to an apparatus for wireless communication. The apparatus may include means for transmitting a PRACH message associated with transmitting repetitions of an Msg3 for a RACH procedure. The apparatus may include means for receiving an RAR. The apparatus may include means for transmitting the repetitions of the Msg3 based at least in part on an alternative interpretation of one or more bitfields of the RAR.

Some aspects described herein relate to an apparatus for wireless communication. The apparatus may include means for receiving, from a UE, a PRACH message associated with transmitting repetitions of an Msg3 for a RACH procedure. The apparatus may include means for transmitting an RAR with one or more bitfields of the RAR configured for an alternative interpretation of the one or more bitfields to determine whether to transmit repetitions of the Msg3, based at least in part on receiving the PRACH message. The apparatus may include means for receiving the repetitions of the Msg3.

In some aspects, a method of wireless communication performed by a UE includes transmitting a PRACH message indicating that the UE is capable of using an alternative interpretation of one or more bits of an RAR to determine whether to transmit repetitions of an Msg3 for a RACH procedure. The method may include receiving the RAR and transmitting the repetitions of the Msg3 based at least in part on the alternative interpretation of the one or more bits of the RAR.

In some aspects, a method of wireless communication performed by a base station includes receiving, from a UE, a PRACH message indicating that the UE is capable of using an alternative interpretation of one or more bits of an RAR to determine whether to transmit repetitions of an Msg3 for a RACH procedure. The method may include transmitting the RAR with the one or more bits of the RAR configured for the alternative interpretation, based at least in part on receiving the PRACH message, and receiving the repetitions of the Msg3.

In some aspects, a UE for wireless communication includes a memory and one or more processors coupled to the memory, the one or more processors configured to transmit a PRACH message indicating that the UE is capable of using an alternative interpretation of one or more bits of an RAR to determine whether to transmit repetitions of an Msg3 for a RACH procedure, receive the RAR, and transmit the repetitions of the Msg3 based at least in part on the alternative interpretation of the one or more bits of the RAR.

In some aspects, a base station for wireless communication includes a memory and one or more processors coupled to the memory, the one or more processors configured to receive, from a UE, a PRACH message indicating that the UE is capable of using an alternative interpretation of one or more bits of an RAR to determine whether to transmit repetitions of an Msg3 for a RACH procedure, transmit the RAR with the one or more bits of the RAR configured for the alternative interpretation, based at least in part on receiving the PRACH message, and receive the repetitions of the Msg3.

In some aspects, a non-transitory computer-readable medium storing a set of instructions for wireless communication includes one or more instructions that, when executed by one or more processors of a UE, cause the UE to transmit a PRACH message indicating that the UE is capable of using an alternative interpretation of one or more bits of an RAR to determine whether to transmit repetitions of an Msg3 for a RACH procedure, receive the RAR, and transmit the repetitions of the Msg3 based at least in part on the alternative interpretation of the one or more bits of the RAR.

In some aspects, a non-transitory computer-readable medium storing a set of instructions for wireless communication includes one or more instructions that, when executed by one or more processors of a base station, cause the base station to receive, from a UE, a PRACH message indicating that the UE is capable of using an alternative interpretation of one or more bits of an RAR to determine whether to transmit repetitions of an Msg3 for a RACH procedure, transmit the RAR with the one or more bits of the RAR configured for the alternative interpretation, based at least in part on receiving the PRACH message, and receive the repetitions of the Msg3.

In some aspects, an apparatus for wireless communication includes means for transmitting a PRACH message indicating that the apparatus is capable of using an alternative interpretation of one or more bits of an RAR to determine whether to transmit repetitions of an Msg3 for a RACH procedure, means for receiving the RAR, and means for transmitting the repetitions of the Msg3 based at least in part on the alternative interpretation of the one or more bits of the RAR.

In some aspects, an apparatus for wireless communication includes means for receiving, from a UE, a PRACH message indicating that the UE is capable of using an alternative interpretation of one or more bits of an RAR to determine whether to transmit repetitions of an Msg3 for a RACH procedure, means for transmitting the RAR with the one or more bits of the RAR configured for the alternative interpretation, based at least in part on receiving the PRACH message, and means for receiving the repetitions of the Msg3.

Aspects generally include a method, apparatus, system, computer program product, non-transitory computer-readable medium, UE, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 is a diagram illustrating an example of a random access response (RAR), in accordance with the present disclosure.

FIG. 6 is a diagram illustrating an example of a transmit power control command table, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
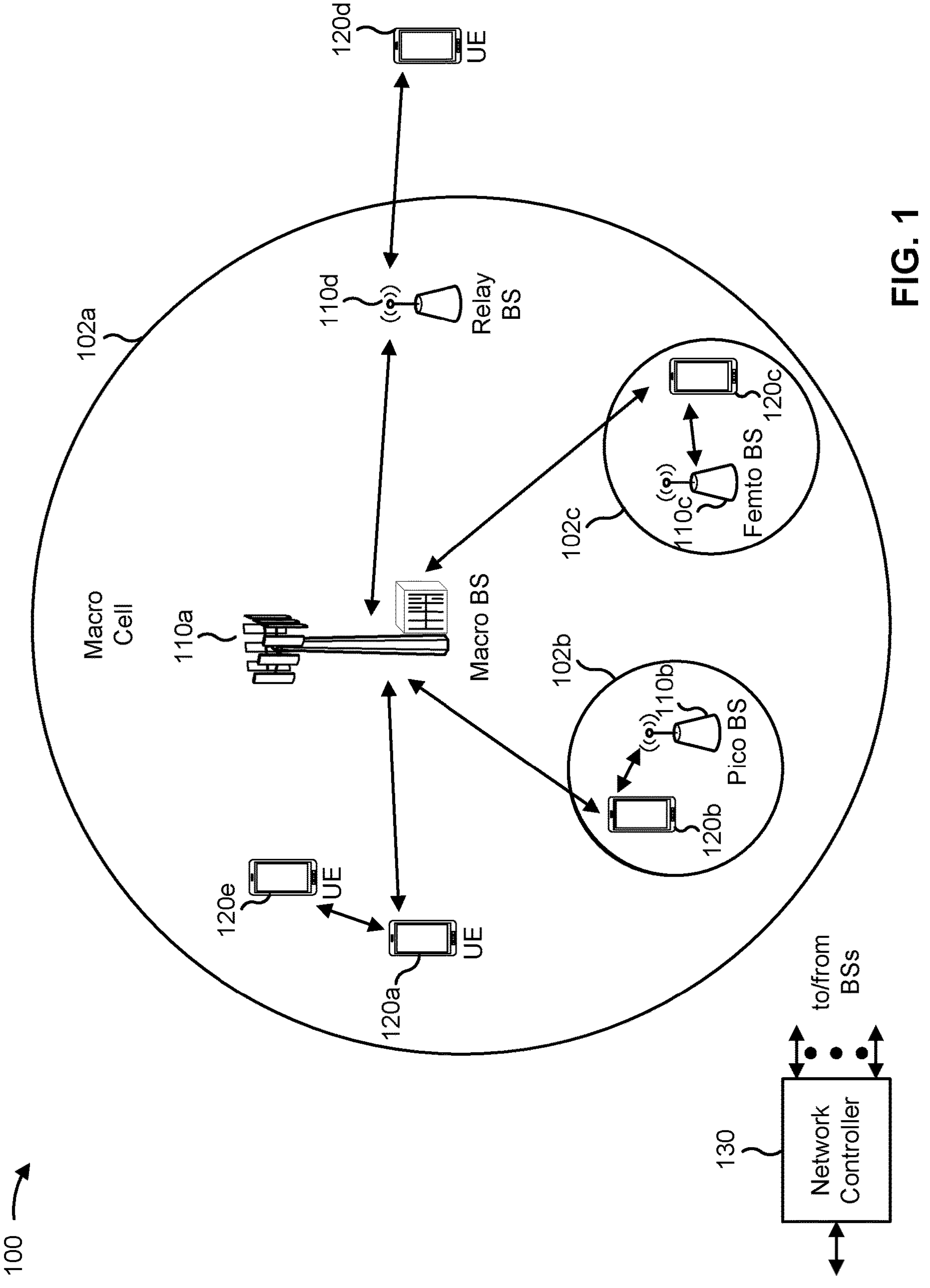
FIG. 1 is a diagram illustrating an example of a wireless network, in accordance with the present disclosure.

FIG. 1 is a diagram illustrating an example of a wireless network 100 in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, or a transmit receive point (TRP). Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, or a virtual network using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, or a relay.

Wireless network 100 may be a heterogeneous network that includes BSs of different types, such as macro BSs, pico BSs, femto BSs, and/or relay BSs. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, and/or an air interface. A frequency may also be referred to as a carrier, and/or a frequency channel. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
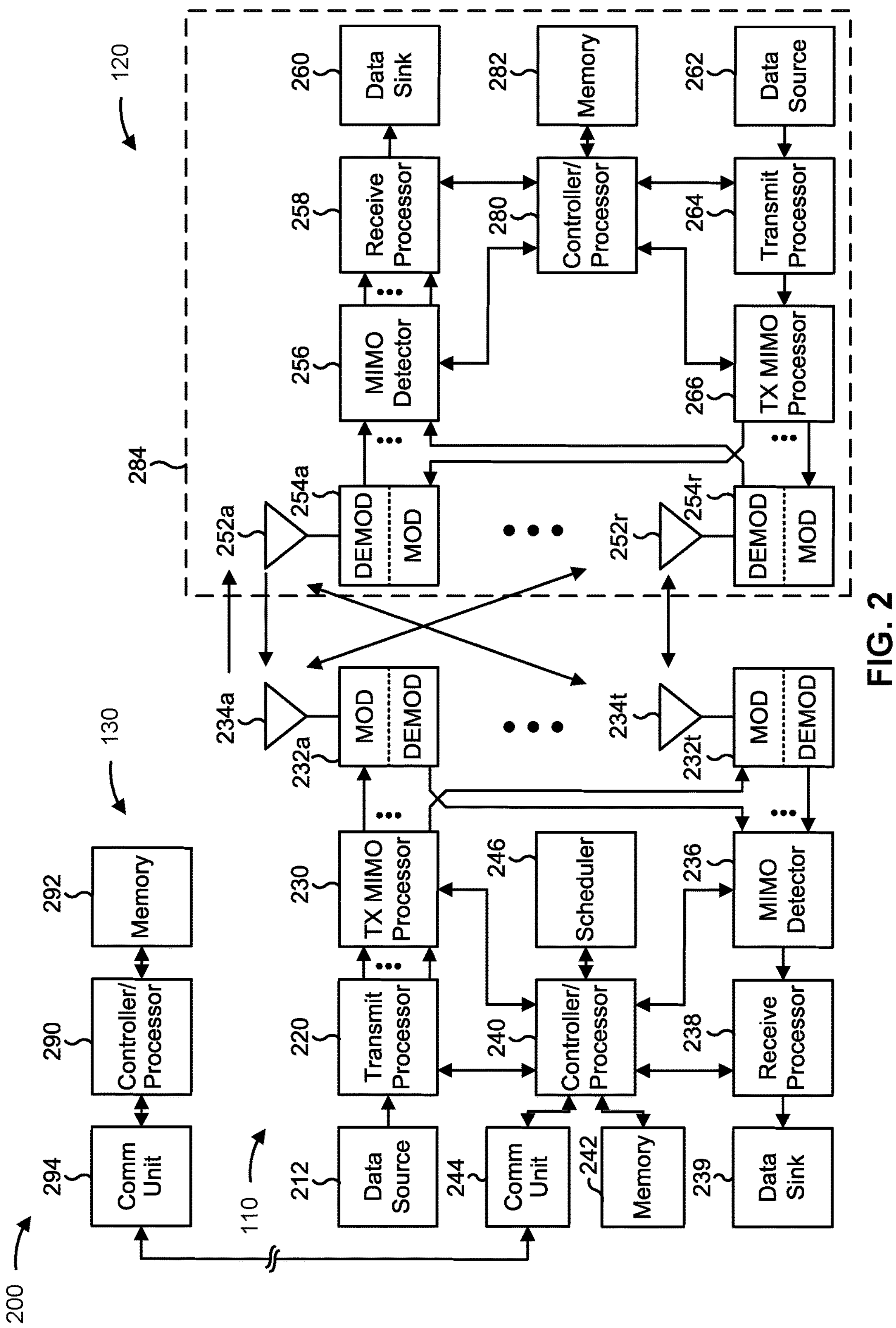
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, upper layer signaling) and provide overhead symbols and control symbols. Transmit processor 220 may also generate reference symbols for reference signals (e.g., a cell-specific reference signal (CRS), a demodulation reference signal (DMRS)) and synchronization signals (e.g., the primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to Tmodulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

One or more antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM), and transmitted to base station 110. In some aspects, a modulator and a demodulator (e.g., MOD/DEMOD 254) of UE 120 may be included in a modem of UE 120. In some aspects, UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (e.g., with reference to FIGS. 3-10).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of base station 110 may be included in a modem of base station 110. In some aspects, base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (e.g., with reference to FIGS. 3-10).

Controller/processor 240 of base station 110, controller/processor 280 of UE 120, and/or any other component(s) of FIG. 2 may perform one or more techniques associated with indicating, via a random access response (RAR) of a random access channel (RACH) procedure, repetition of an Msg3, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of base station 110 and/or UE 120, may cause the one or more processors, UE 120, and/or base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

In some aspects, UE 120 includes means for transmitting a physical random access channel (PRACH) message associated with transmitting repetitions of an Msg3 for a RACH procedure, means for receiving an RAR, and/or means for transmitting the repetitions of the Msg3 based at least in part on an alternative interpretation of one or more bitfields of the RAR. The means for UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, base station 110 includes means for receiving, from a UE, a PRACH message associated with transmitting repetitions of an Msg3 for a RACH procedure, means for transmitting an RAR with one or more bits of the RAR configured for the alternative interpretation by the UE, based at least in part on receiving the PRACH message, and/or means for receiving the repetitions of the Msg3. The means for base station 110 to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, UE 120 includes means for transmitting a PRACH message indicating that UE 120 is capable of using an alternative interpretation of one or more bits of an RAR to determine whether to transmit repetitions of an Msg3 for a RACH procedure, means for receiving the RAR, and/or means for transmitting the repetitions of the Msg3 based at least in part on the alternative interpretation of the one or more bits of the RAR. The means for UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, base station 110 includes means for receiving, from a UE, a PRACH message indicating that the UE is capable of using an alternative interpretation of one or more bits of an RAR to determine whether to transmit repetitions of an Msg3 for a RACH procedure, means for transmitting the RAR with the one or more bits of the RAR configured for the alternative interpretation, based at least in part on receiving the PRACH message, and/or means for receiving the repetitions of the Msg3. The means for base station 110 to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, base station 110 includes means for configuring a transmit power control (TPC) command table to indicate one or more of transmission of the repetitions of the Msg3 or a quantity of the repetitions of the Msg3.

In some aspects, base station 110 includes means for configuring a frequency domain resource allocation (FDRA) table associated with the RAR to indicate transmission of the repetitions of the Msg3.

As indicated above, FIG. 2 is provided as an example. Other examples may differ from what is described with regard to FIG. 2.

Figure 3:
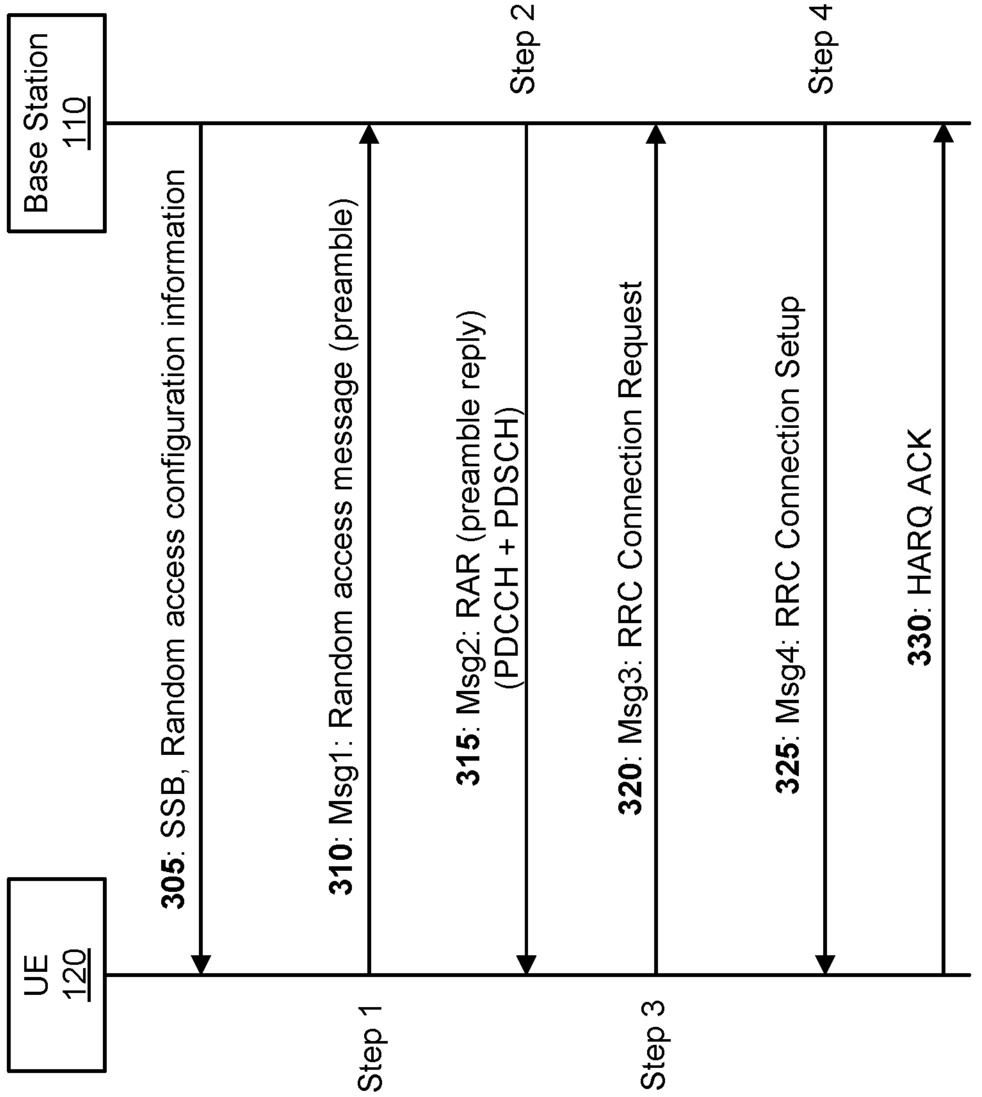
FIG. 3 is a diagram illustrating an example of a four-step random access channel procedure, in accordance with the present disclosure.

FIG. 3 is a diagram illustrating an example 300 of a four-step RACH procedure, in accordance with the present disclosure. As shown in FIG. 3, a base station 110 and a UE 120 may communicate with one another to perform the four-step RACH procedure.

As shown by reference number 305, base station 110 may transmit, and UE 120 may receive, one or more synchronization signal blocks (SSBs) and random access configuration information. In some aspects, the random access configuration information may be transmitted in and/or indicated by system information (e.g., in one or more system information blocks (SIBs)) and/or an SSB, such as for contention-based random access. Additionally, or alternatively, the random access configuration information may be transmitted in a radio resource control (RRC) message and/or a physical downlink control channel (PDCCH) order message that triggers a RACH procedure, such as for contention-free random access. The random access configuration information may include one or more parameters to be used in the RACH procedure, such as one or more parameters for transmitting a random access message (RAM) and/or one or more parameters for receiving an RAR.

As shown by reference number 310, UE 120 may transmit a RAM, which may include a preamble (sometimes referred to as a random access preamble, a PRACH preamble, or a RAM preamble). The message that includes the preamble may be referred to as a message 1, Msg1, msg1, MSG1, a first message, or an initial message in a four-step RACH procedure. The random access message may include a random access preamble identifier.

As shown by reference number 315, base station 110 may transmit an RAR as a reply to the preamble. The message that includes the RAR may be referred to as message 2, Msg2, msg2, MSG2, or a second message in a four-step RACH procedure. In some aspects, the RAR may indicate the detected random access preamble identifier (e.g., received from UE 120 in Msg1). Additionally, or alternatively, the RAR may indicate a resource allocation to be used by UE 120 to transmit message 3 (Msg3).

In some aspects, as part of the second step of the four-step RACH procedure, base station 110 may transmit a PDCCH communication for the RAR. The PDCCH communication may schedule a physical downlink shared channel (PDSCH) communication that includes the RAR. For example, the PDCCH communication may indicate a resource allocation for the PDSCH communication. Also as part of the second step of the four-step RACH procedure, base station 110 may transmit the PDSCH communication for the RAR, as scheduled by the PDCCH communication. The RAR may be included in a medium access control (MAC) protocol data unit (PDU) of the PDSCH communication.

As shown by reference number 320, UE 120 may transmit an RRC connection request message. The RRC connection request message may be referred to as message 3, Msg3, msg3, MSG3, or a third message of a four-step RACH procedure. In some aspects, the RRC connection request may include a UE identifier, uplink control information (UCI), and/or a physical uplink shared channel (PUSCH) communication (e.g., an RRC connection request).

As shown by reference number 325, base station 110 may transmit an RRC connection setup message. The RRC connection setup message may be referred to as message 4, Msg4, msg4, MSG4, or a fourth message of a four-step RACH procedure. In some aspects, the RRC connection setup message may include the detected UE identifier, a timing advance value, and/or contention resolution information. As shown by reference number 330, if UE 120 successfully receives the RRC connection setup message, UE 120 may transmit a hybrid automatic repeat request (HARQ) acknowledgement (ACK).

As indicated above, FIG. 3 is provided as an example. Other examples may differ from what is described with regard to FIG. 3.

FIG. 4 is a diagram illustrating an example 400 of an RAR, in accordance with the present disclosure. Example 400 shows an arrangement of bits for the RAR.

The RAR may have bits that are interpreted by a UE for specific aspects of transmitting a PUSCH communication. The RAR may include 7 octets of bits for indicating a timing advance, an uplink grant, a cellular radio network temporary identifier (C-RNTI), or other information to the UE. The uplink grant field may have 27 bits that are interpreted by the UE to determine how to transmit the PUSCH communication. For example, the uplink grant field may include a 1-bit frequency-hopping flag. If the frequency-hopping flag is 0, the UE may interpret the bit such that the UE transmits the PUSCH communication without frequency hopping. Otherwise, the UE may transmit the PUSCH with frequency hopping. The uplink grant field may also include 14 FDRA bits (in an FDRA bitfield) to identify frequency resources and 4 time domain resource allocation (TDRA) bits (in a TDRA bitfield) to identify time resources. The uplink grant field may include 4 bits (in an MCS bitfield) to identify an MCS of the PUSCH communication from the first 16 indices of an applicable MCS index table for PUSCH. The uplink grant field may also include 3 bits for a transmit power control (TPC) command value (in a TPC command bitfield) that is used for setting the power of the PUSCH communication. The uplink grant field may also include a 1-bit channel state information (CSI) request field that is a reserved field. Accordingly, a UE may use a regular interpretation of any of these bits (or bitfields) to determine how to transmit the PUSCH communication.

With regard to the RACH procedure, transmission of an Msg3 may be repeated. That is, the UE may transmit repetitions of the Msg3 on the PUSCH. In some aspects, the RAR may be used to indicate repetition of the Msg3. However, adding bits to the RAR to indicate repetition of the Msg3 may add overhead and create issues with how to handle an RAR size that can change across different UEs. The extra bits and RAR size issues may cause a UE to consume additional processing resources and signaling resources.

The RAR may have a regular interpretation of its bits, as described above, that a UE may use to transmit a PUSCH communication. According to various aspects described herein, a UE may use an alternative interpretation of one or more bits (bitfields) of the RAR to determine whether to transmit a single instance of the Msg3 or multiple repetitions of the Msg3. For example, the UE may use an alternative interpretation of one of the TDRA bits in the RAR to determine to transmit repetitions of the Msg3 rather than a single instance of the Msg3. The UE may also use an alternative interpretation of the TDRA bits to determine a number of repetitions of the Msg3. For example, one or all of the TDRA bits may be interpreted to indicate a number (e.g., 2, 4) of the repetitions of the Msg3. As a result of using the alternative interpretation, the UE may able to determine whether to transmit repetitions of the Msg3 (and how many times) without consuming additional processing resources and signaling resources for handling additional RAR bits or for handling RARs of different sizes. The alternative interpretation of the one or more RAR bitfields may replace or may be in addition to the regular interpretation of the same one or more RAR bitfields. The alternative interpretation of the RAR may be an interpretation that indicates other information, or information in addition to, what is regularly interpreted from the RAR (e.g., no indication of repetition of the Msg3).

A base station may not have information as to whether a UE is capable of an alternative interpretation of RAR bitfields. If the base station uses an alternative interpretation that the UE is not aware of, the UE may fail to transmit repetitions of the Msg3. If the Msg3 is not successfully received by the base station, the RACH procedure may fail and have to restart. This may waste time, power, processing resources, and signaling resources.

In some aspects, the UE may indicate, to the base station or another receiving device, a capability of the UE to use an alternative interpretation of RAR bitfields to determine whether to transmit repetitions of the Msg3. The UE may transmit a PRACH message that indicates the capability or a request for Msg3 repetition. For example, the UE may transmit a particular RACH preamble or transmit a PRACH message in a particular RACH occasion that the base station may identify as an indication of a UE capability for using an alternative interpretation of one or more RAR bitfields. As a result, the base station may use an alternative interpretation of RAR bitfields when appropriate for the UE. The UE and the base station may conserve processing resources and signaling resources that would otherwise be consumed by failed reception of the Msg3.

As indicated above, FIG. 4 is provided as an example. Other examples may differ from what is described with regard to FIG. 4.

Figure 5:
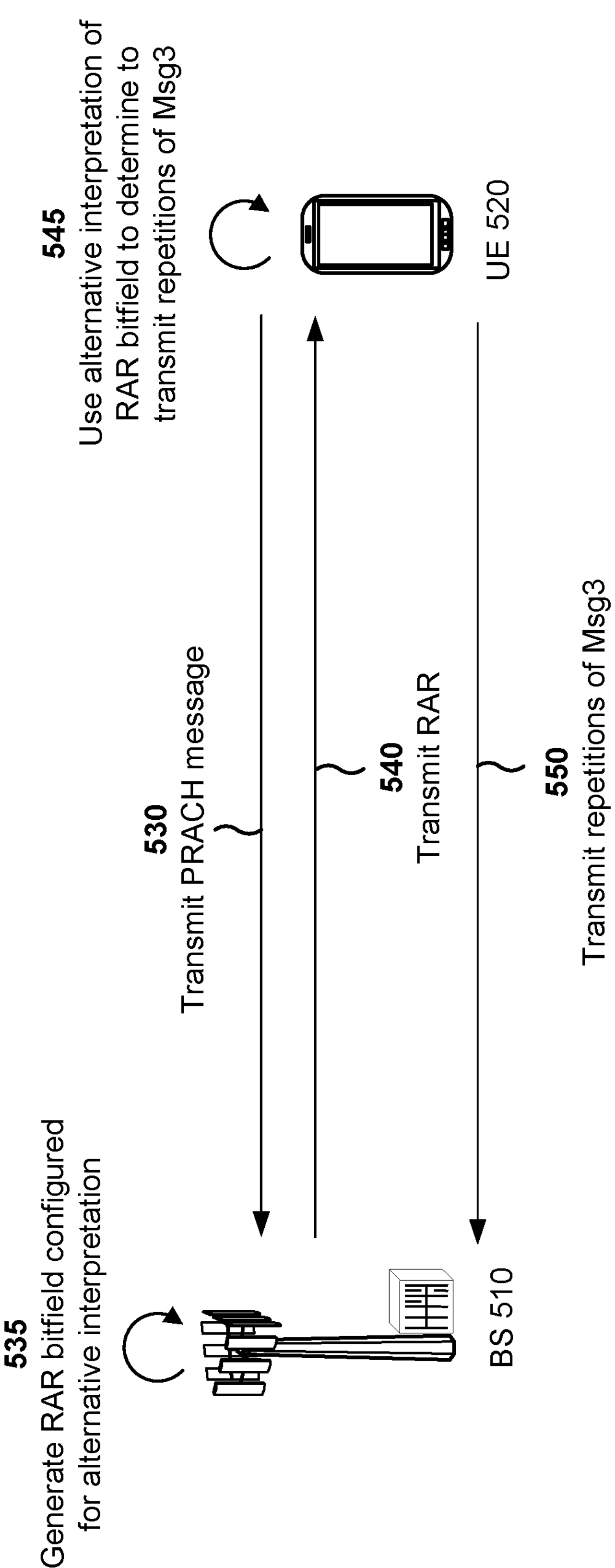
FIG. 5 is a diagram illustrating an example of indicating, via an RAR, repetition of an Msg3, in accordance with the present disclosure.

FIG. 5 is a diagram illustrating an example 500 of indicating, via an RAR, repetition of an Msg3, in accordance with the present disclosure. As shown in FIG. 5, a base station 510 (e.g., BS 110 depicted in FIGS. 1-3) and a UE 520 (e.g., a UE 120 depicted in FIGS. 1-3) may communicate with one another on an uplink or a downlink.

As shown by reference number 530, UE 520 may transmit a PRACH message associated with Msg3 repetition. The PRACH message may be a request for Msg3 repetition or may indicate that UE 520 is capable of using an alternative interpretation of one or more RAR bitfields to determine whether to transmit repetitions of the Msg3. The indication of the capability may be implicitly indicated by the PRACH message. For example, the PRACH message may be a preamble that the base station identifies as indicating that UE 520 is able to use the alternative interpretation. The PRACH message may also be received in a RACH occasion that indicates that UE 520 is capable of using the alternative interpretation. The PRACH message may be an alternative PRACH message or alternative format for a PRACH message. In some aspects, the PRACH message may be a request for the alternative interpretation.

As shown by reference number 535, BS 510 may generate RAR bitfields configured for alternative interpretation by UE 520. This may include changing particular bitfields of the RAR. Some RAR bits may not be changed, but may be verified for consistency with indicating, or not indicating, repetition of the Msg3. As shown by reference number 540, BS 510 may transmit the RAR to UE 520.

As shown by reference number 545, UE 520 may use an alternative interpretation of one or more RAR bitfields to determine whether to transmit repetitions of the Msg3. In some aspects, UE 520 may use an alternative interpretation of a TDRA bitfield, a TPC bitfield, and/or an FDRA bitfield. In some aspects, UE 520 may associate an index of a starting resource block to Msg3 repetition (or number of repetitions). This may involve a modulo operation. For example, a modulo 2 or modulo 4 of an index value may indicate 2 repetitions, 4 repetitions, 8 repetitions, and so forth. UE 520 may use a preconfigured coefficient, modulo base, and/or offset as part of the modulo operation.

In some aspects, UE 520 may use an alternative interpretation of an MCS bitfield, a reserved bit, or a frequency-hopping bit to indicate repetition of the Msg3. UE 520 may be preconfigured (e.g., via a system information block, remaining minimum system information) with a number of repetitions or other information for transmitting repetitions of the Msg3 if repetition of the Msg3 is indicated. The frequency-hopping bit may indicate inter-frequency hopping or intra-frequency hopping for the repetitions of the Msg3. The frequency-hopping bit may be used in combination with an indication of repetition elsewhere in the RAR to determine the number of repetitions. The frequency-hopping bit may be associated with preconfigured information indicating intra-frequency, inter-frequency, and/or the number of repetitions associated with the repetitions of the Msg3 and/or the PUSCH communication.

In some aspects, UE 520 may use an alternative interpretation of a C-RNTI to determine to repeat transmission of the Msg3. For example, UE 520 may use a modulo operation (e.g., mod 2) on the C-RNTI to determine a value that indicates repetition of the Msg3 (e.g., 1) or does not indicate repetition of the Msg3 (e.g., 0). While this may reduce a pool of C-RNTI values, there may be a sufficient number of C-RNTI values that remain available for regular use.

As shown by reference number 550, UE 520 may transmit repetitions of the Msg3 based at least in part on determining, from the alternative interpretation, to transmit the repetitions. By using the alternative interpretation, UE 520 improves reception of the Msg3 for the RACH procedure while not consuming additional processing resources and signaling resources for a larger size RAR or for a separate message.

As indicated above, FIG. 5 is provided as an example. Other examples may differ from what is described with regard to FIG. 5.

FIG. 6 is a diagram illustrating an example 600 of a TPC command table, in accordance with the present disclosure.

In some aspects, an alternative interpretation of one or more RAR bitfields may point to or may otherwise be associated with additional information, such as an extra column of a table. Example 600 shows a TPC command table with an extra, third column. The TPC command table may have an index value indicated by a TPC bitfield of the RAR. The TPC command table, based at least in part on the indicated index value, may indicate a transmit power for a PUSCH communication (e.g., −6 decibels (dB), −4 dB, −2 dB, 0 dB, 2 dB, 4 dB, 6 dB, or 8 dB). The extra column may have one or more values that indicate repetition of the Msg3 and/or a number of repetitions. For example, a value of 1 in the extra column may indicate no repetition of the Msg3, while a value of 2 or 4 may indicate 2 repetitions or 4 repetitions, respectively. Alternatively, or additionally, an alternative TPC command table may be indicated and/or used. In some aspects, UE 520 may also refer to a modified or alternative FDRA table or a modified or alternative MCS table, with values indicating repetition and/or a number of repetitions. In some aspects, the alternative interpretation of the RAR bitfields may involve other RAR bitfields or other information or tables associated with the RAR.

As indicated above, FIG. 6 is provided as an example. Other examples may differ from what is described with regard to FIG. 6.

Figure 7:
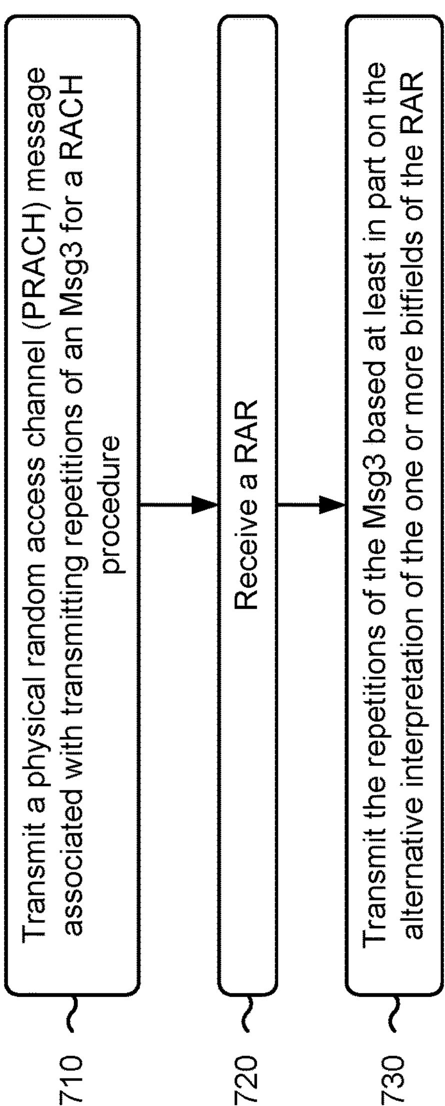
FIG. 7 is a diagram illustrating an example process performed, for example, by a UE, in accordance with the present disclosure.
Figure 7:

FIG. 7 is a diagram illustrating an example process 700 performed, for example, by a UE, in accordance with the present disclosure. Example process 700 is an example where the UE (e.g., a UE 120 depicted in FIGS. 1-3, UE 520 depicted in FIG. 5) performs operations associated with indicating Msg3 repetition via an RAR.

As shown in FIG. 7, in some aspects, process 700 may include transmitting a PRACH message associated with transmitting repetitions of an Msg3 for a RACH procedure (block 710). For example, the UE (e.g., using transmission component 904 depicted in FIG. 9) may transmit a PRACH message associated with transmitting repetitions of an Msg3 for a RACH procedure, as described above.

As further shown in FIG. 7, in some aspects, process 700 may include receiving an RAR (block 720). For example, the UE (e.g., using reception component 902 depicted in FIG. 9) may receive an RAR, as described above.

As further shown in FIG. 7, in some aspects, process 700 may include transmitting the repetitions of the Msg3 based at least in part on an alternative interpretation of one or more bitfields of the RAR (block 730). For example, the UE (e.g., using transmission component 904 depicted in FIG. 9) may transmit the repetitions of the Msg3 based at least in part on an alternative interpretation of one or more bitfields of the RAR, as described above.

Process 700 may include additional aspects, such as any single aspect or any combination of aspects described below and/or in connection with one or more other processes described elsewhere herein.

In a first aspect, the PRACH message includes a preamble sequence that indicates that the UE is capable of using the alternative interpretation.

In a second aspect, alone or in combination with the first aspect, the PRACH message is transmitted in a PRACH occasion that indicates that the UE is capable of using the alternative interpretation.

In a third aspect, alone or in combination with one or more of the first and second aspects, transmitting the repetitions of the Msg3 includes transmitting the repetitions of the Msg3 based at least in part on an alternative interpretation of a TDRA bitfield of the RAR.

In a fourth aspect, alone or in combination with one or more of the first through third aspects, transmitting the repetitions of the Msg3 includes transmitting the repetitions of the Msg3 based at least in part on an alternative interpretation of a TPC bitfield of the RAR or based at least in part on a TPC table associated with the RAR.

In a fifth aspect, alone or in combination with one or more of the first through fourth aspects, the TPC table indicates a quantity of the repetitions of the Msg3.

In a sixth aspect, alone or in combination with one or more of the first through fifth aspects, transmitting the repetitions of the Msg3 includes transmitting the repetitions of the Msg3 based at least in part on an alternative interpretation of an FDRA bitfield of the RAR.

In a seventh aspect, alone or in combination with one or more of the first through sixth aspects, transmitting the repetitions of the Msg3 includes transmitting the repetitions of the Msg3 based at least in part on an FDRA table associated with the RAR.

In an eighth aspect, alone or in combination with one or more of the first through seventh aspects, the FDRA table indicates the alternative interpretation by an index of a starting resource block (RB).

In a ninth aspect, alone or in combination with one or more of the first through eighth aspects, the FDRA table indicates a quantity of the repetitions of the Msg3.

In a tenth aspect, alone or in combination with one or more of the first through ninth aspects, transmitting the repetitions of the Msg3 includes transmitting the repetitions of the Msg3 based at least in part on an alternative interpretation of an MCS bitfield of the RAR.

In an eleventh aspect, alone or in combination with one or more of the first through tenth aspects, the MCS bitfield indicates an index of an MCS index table.

In a twelfth aspect, alone or in combination with one or more of the first through eleventh aspects, the index indicates repetition.

In a thirteenth aspect, alone or in combination with one or more of the first through twelfth aspects, the index indicates a quantity of repetitions.

In a fourteenth aspect, alone or in combination with one or more of the first through thirteenth aspects, transmitting the repetitions of the Msg3 includes transmitting the repetitions of the Msg3 based at least in part on an MCS table associated with the RAR.

In a fifteenth aspect, alone or in combination with one or more of the first through fourteenth aspects, the MCS table includes a value that indicates repetition.

In a sixteenth aspect, alone or in combination with one or more of the first through fifteenth aspects, the MCS table includes values that each indicate a quantity of repetitions.

In a seventeenth aspect, alone or in combination with one or more of the first through sixteenth aspects, transmitting the repetitions of the Msg3 includes transmitting the repetitions of the Msg3 based at least in part on an alternative interpretation of a reserve bit of the RAR.

In an eighteenth aspect, alone or in combination with one or more of the first through seventeenth aspects, transmitting the repetitions of the Msg3 includes transmitting the repetitions of the Msg3 based at least in part on an alternative interpretation of a frequency-hopping bitfield of the RAR.

In a nineteenth aspect, alone or in combination with one or more of the first through eighth aspects, the frequency-hopping bitfield of the RAR indicates inter-slot frequency-hopping for the repetitions of the Msg3 over multiple slots.

In a twentieth aspect, alone or in combination with one or more of the first through nineteenth aspects, transmitting the repetitions of the Msg3 includes transmitting the repetitions of the Msg3 based at least in part on an alternative interpretation of a C-RNTI bitfield of the RAR.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
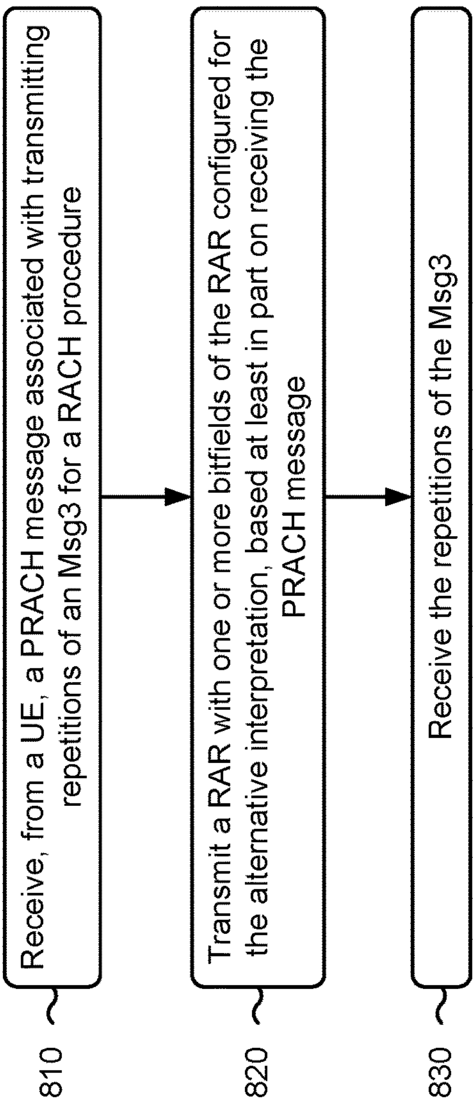
FIG. 8 is a diagram illustrating an example process performed, for example, by a base station, in accordance with the present disclosure.

FIG. 8 is a diagram illustrating an example process 800 performed, for example, by a base station, in accordance with the present disclosure. Example process 800 is an example where the base station (e.g., base station 110 depicted in FIGS. 1-3, BS 510 depicted in FIG. 5) performs operations associated with indicating Msg3 repetition via an RAR.

As shown in FIG. 8, in some aspects, process 800 may include receiving, from a UE, a PRACH message associated with transmitting repetitions of an Msg3 for a RACH procedure (block 810). For example, the base station (e.g., using reception component 1002 depicted in FIG. 10) may receive, from a UE, a PRACH message associated with transmitting repetitions of an Msg3 for a RACH procedure, as described above.

As further shown in FIG. 8, in some aspects, process 800 may include transmitting an RAR with one or more bitfields of the RAR configured for the alternative interpretation by the UE, based at least in part on receiving the PRACH message (block 820). For example, the base station (e.g., using transmission component 1004 depicted in FIG. 10) may transmit an RAR with one or more bitfields of the RAR configured for the alternative interpretation, based at least in part on receiving the PRACH message, as described above.

As further shown in FIG. 8, in some aspects, process 800 may include receiving the repetitions of the Msg3 (block 830). For example, the base station (e.g., using reception component 1002 depicted in FIG. 10) may receive the repetitions of the Msg3, as described above.

Process 800 may include additional aspects, such as any single aspect or any combination of aspects described below and/or in connection with one or more other processes described elsewhere herein.

In a first aspect, the transmitting includes configuring the one or more bitfields for the alternative interpretation based at least in part on the PRACH message including a preamble sequence that indicates that the UE is capable of using the alternative interpretation.

In a second aspect, alone or in combination with the first aspect, the transmitting includes configuring the one or more bitfields for the alternative interpretation based at least in part on the PRACH message being received in a PRACH occasion that indicates that the UE is capable of using the alternative interpretation.

In a third aspect, alone or in combination with one or more of the first and second aspects, the one or more bitfields configured for the alternative interpretation include a TDRA bitfield of the RAR.

In a fourth aspect, alone or in combination with one or more of the first through third aspects, the one or more bitfields configured for the alternative interpretation include a TPC bitfield of the RAR.

In a fifth aspect, alone or in combination with one or more of the first through fourth aspects, process 800 includes configuring a TPC table to indicate transmission of the repetitions of the Msg3 or a quantity of the repetitions of the Msg3.

In a sixth aspect, alone or in combination with one or more of the first through fifth aspects, the one or more bitfields configured for the alternative interpretation include an FDRA bitfield of the RAR.

In a seventh aspect, alone or in combination with one or more of the first through sixth aspects, process 800 includes configuring an FDRA table associated with the RAR to indicate transmission of the repetitions of the Msg3.

In an eighth aspect, alone or in combination with one or more of the first through seventh aspects, the FDRA table indicates transmission of the repetitions of the Msg3 by an index of a starting RB.

In a ninth aspect, alone or in combination with one or more of the first through eighth aspects, the FDRA table indicates a quantity of the repetitions of the Msg3.

In a tenth aspect, alone or in combination with one or more of the first through ninth aspects, the one or more bitfields configured for the alternative interpretation include an MCS bitfield of the RAR.

In an eleventh aspect, alone or in combination with one or more of the first through tenth aspects, the MCS bitfield indicates an index of an MCS index table.

In a twelfth aspect, alone or in combination with one or more of the first through eleventh aspects, the index indicates repetition.

In a thirteenth aspect, alone or in combination with one or more of the first through twelfth aspects, the index indicates a quantity of repetitions.

In a fourteenth aspect, alone or in combination with one or more of the first through thirteenth aspects, transmitting the repetitions of the Msg3 includes transmitting the repetitions of the Msg3 based at least in part on an MCS table associated with the RAR.

In a fifteenth aspect, alone or in combination with one or more of the first through fourteenth aspects, the MCS table includes a value that indicates repetition.

In a sixteenth aspect, alone or in combination with one or more of the first through fifteenth aspects, the MCS table includes values that each indicate a quantity of repetitions.

In a seventeenth aspect, alone or in combination with one or more of the first through sixteenth aspects, the one or more bits configured for the alternative interpretation include a reserve bit of the RAR.

In an eighteenth aspect, alone or in combination with one or more of the first through seventeenth aspects, the one or more bits configured for the alternative interpretation include a frequency-hopping bitfield of the RAR.

In a nineteenth aspect, alone or in combination with one or more of the first through eighteenth aspects, the frequency-hopping bitfield of the RAR indicates inter-slot frequency-hopping for the repetitions of the Msg3 over multiple slots.

In a twentieth aspect, alone or in combination with one or more of the first through nineteenth aspects, the one or more bitfields configured for the alternative interpretation include a C-RNTI bitfield of the RAR.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
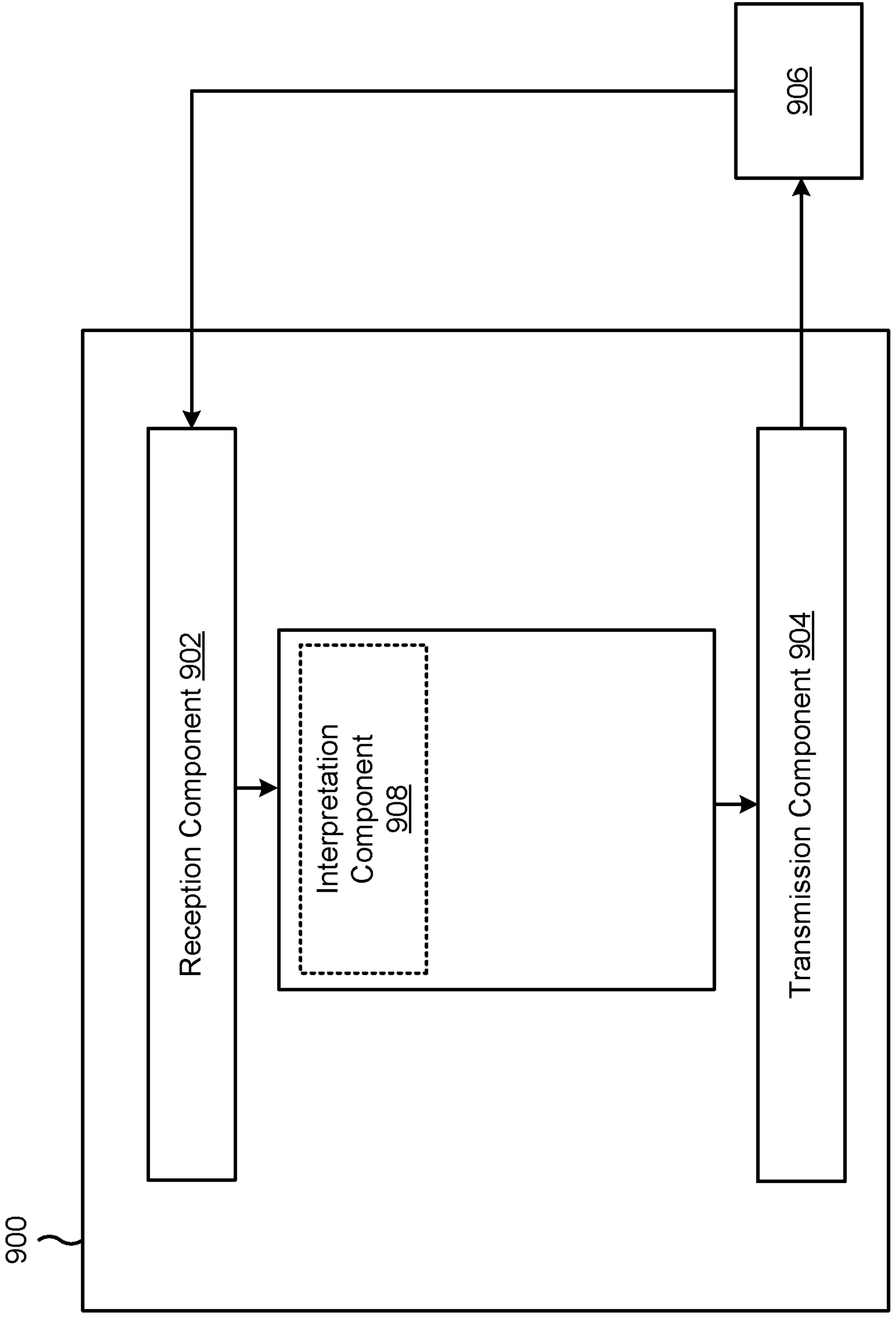
FIGS. 9-10 are block diagrams of example apparatuses for wireless communication, in accordance with the present disclosure.

FIG. 9 is a block diagram of an example apparatus 900 for wireless communication. The apparatus 900 may be a UE (e.g., a UE 120, UE 520), or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include an interpretation component 908, among other examples.

In some aspects, the apparatus 900 may be configured to perform one or more operations described herein in connection with FIGS. 1-6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The transmission component 904 may transmit a PRACH message. The reception component 902 may receive an RAR. The interpretation component 908 may use an alternative interpretation of one or more RAR bitfields to determine to transmit repetitions of the Msg3. The transmission component 904 may transmit the repetitions of the Msg3 based at least in part on the alternative interpretation of the one or more bitfields of the RAR.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
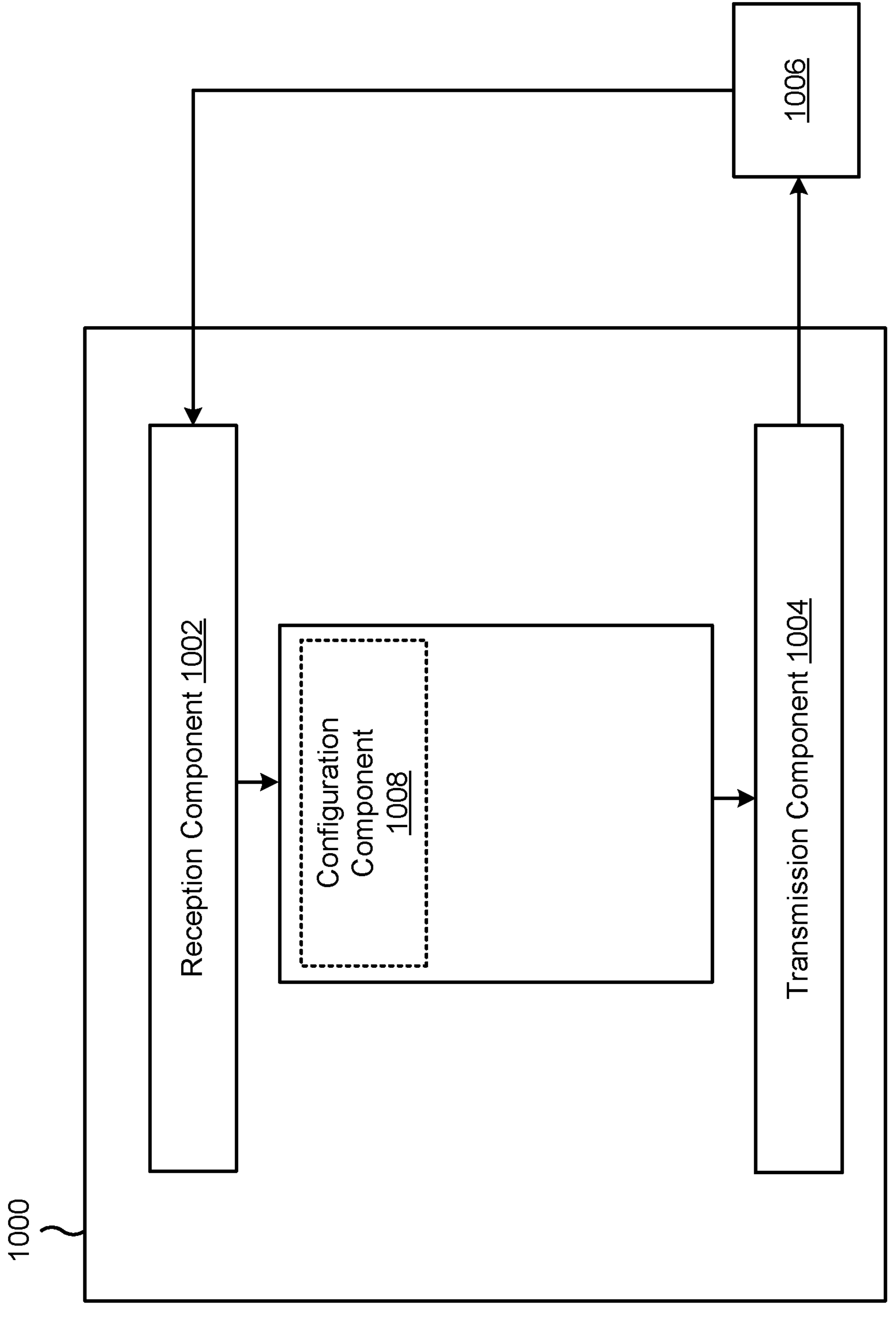

FIG. 10 is a block diagram of an example apparatus 1000 for wireless communication. The apparatus 1000 may be a base station (e.g., base station 110, BS 510), or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may a configuration component 1008, among other examples.

In some aspects, the apparatus 1000 may be configured to perform one or more operations described herein in connection with FIGS. 1-6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the base station described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a demodulator, a MIMO detector, a receive processor, a controller/processor, a memory, or a combination thereof, of the base station described above in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the base station described above in connection with FIG. 2. In some aspects, the transmission component 1004 may be co-located with the reception component 1002 in a transceiver.

The reception component 1002 may receive, from a UE, such as apparatus 1006, a PRACH message. The configuration component 1008 may configure one or more bitfields of the RAR for an alternative interpretation, by the UE, based at least in part on a capability of the UE for using the alternative interpretation and/or traffic conditions. The transmission component 1004 may transmit the RAR with the one or more bitfields of the RAR configured for the alternative interpretation, based at least in part on receiving the PRACH message. The reception component 1002 may receive the repetitions of the Msg3.

The configuration component 1008 may configure an MCS bitfield to indicate transmission of the repetitions of the Msg3 or a quantity of the repetitions of the Msg3. The configuration component 1008 may configure an MCS table associated with the RAR to indicate transmission of the repetitions of the Msg3.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The foregoing disclosure provides illustration and description, but is not intended to be exhaustive or to limit the aspects to the precise forms disclosed. Modifications and variations may be made in light of the above disclosure or may be acquired from practice of the aspects.

The following provides an overview of some Aspects of the present disclosure:

Aspect 1: A method of wireless communication performed by a user equipment (UE), comprising: transmitting a physical random access channel (PRACH) message indicating that the UE is capable of using an alternative interpretation of one or more bits of a random access response (RAR) to determine whether to transmit repetitions of an Msg3 for a RACH procedure; receiving the RAR; and transmitting the repetitions of the Msg3 based at least in part on the alternative interpretation of the one or more bits of the RAR.

Aspect 2: The method of Aspect 1, wherein the PRACH message includes a preamble sequence that indicates that the UE is capable of using the alternative interpretation.

Aspect 3: The method of Aspect 1 or 2, wherein the PRACH message is transmitted in a PRACH occasion that indicates that the UE is capable of using the alternative interpretation.

Aspect 4: The method of any of Aspects 1-3, wherein transmitting the repetitions of the Msg3 includes transmitting the repetitions of the Msg3 based at least in part on an alternative interpretation of time domain resource allocation bits of the RAR.

Aspect 5: The method of any of Aspects 1-4, wherein transmitting the repetitions of the Msg3 includes transmitting the repetitions of the Msg3 based at least in part on an alternative interpretation of transmit power control (TPC) bits of the RAR or based at least in part on a TPC table associated with the RAR.

Aspect 6: The method of Aspect 5, wherein the TPC table indicates a quantity of the repetitions of the Msg3.

Aspect 7: The method of any of Aspects 1-6, wherein transmitting the repetitions of the Msg3 includes transmitting the repetitions of the Msg3 based at least in part on an alternative interpretation of frequency domain resource allocation (FDRA) bits of the RAR.

Aspect 8: The method of any of Aspects 1-7, wherein transmitting the repetitions of the Msg3 includes transmitting the repetitions of the Msg3 based at least in part on a frequency domain resource allocation (FDRA) table associated with the RAR.

Aspect 9: The method of Aspect 8, wherein the FDRA table indicates the alternative interpretation by an index of a starting resource block.

Aspect 10: The method of Aspect 8, wherein the FDRA table indicates a quantity of the repetitions of the Msg3.

Aspect 11: The method of any of Aspects 1-10, wherein transmitting the repetitions of the Msg3 includes transmitting the repetitions of the Msg3 based at least in part on an alternative interpretation of modulation coding scheme bits of the RAR.

Aspect 12: The method of any of Aspects 1-11, wherein transmitting the repetitions of the Msg3 includes transmitting the repetitions of the Msg3 based at least in part on an alternative interpretation of a reserve bit of the RAR.

Aspect 13: The method of any of Aspects 1-12, wherein transmitting the repetitions of the Msg3 includes transmitting the repetitions of the Msg3 based at least in part on an alternative interpretation of a frequency-hopping bit of the RAR.

Aspect 14: The method of Aspect 13, wherein the frequency-hopping bit of the RAR indicates inter-slot frequency-hopping for the repetitions of the Msg3 over multiple slots.

Aspect 15: The method of any of Aspects 1-14, wherein transmitting the repetitions of the Msg3 includes transmitting the repetitions of the Msg3 based at least in part on an alternative interpretation of a cellular radio network temporary identifier bit of the RAR.

Aspect 16: A method of wireless communication performed by a base station, comprising: receiving, from a user equipment (UE), a physical random access channel (PRACH) message indicating that the UE is capable of using an alternative interpretation of one or more bits of a random access response (RAR) to determine whether to transmit repetitions of an Msg3 for a RACH procedure; transmitting the RAR with the one or more bits of the RAR configured for the alternative interpretation, based at least in part on receiving the PRACH message; and receiving the repetitions of the Msg3.

Aspect 17: The method of Aspect 16, wherein the transmitting includes configuring the one or more bits for the alternative interpretation based at least in part on the PRACH message including a preamble sequence that indicates that the UE is capable of using the alternative interpretation.

Aspect 18: The method of Aspect 16 or 17, wherein the transmitting includes configuring the one or more bits for the alternative interpretation based at least in part on the PRACH message being received in a PRACH occasion that indicates that the UE is capable of using the alternative interpretation.

Aspect 19: The method of any of Aspects 16-18, wherein the one or more bits configured for the alternative interpretation include time domain resource allocation bits of the RAR.

Aspect 20: The method of any of Aspects 16-19, wherein the one or more bits configured for the alternative interpretation include transmit power control bits of the RAR.

Aspect 21: The method of any of Aspects 16-20, further comprising configuring a transmit power control table to indicate one or more of transmission of the repetitions of the Msg3 or a quantity of the repetitions of the Msg3.

Aspect 22: The method of any of Aspects 16-21, wherein the one or more bits configured for the alternative interpretation include frequency domain resource allocation (FDRA) bits of the RAR.

Aspect 23: The method of any of Aspects 16-22, further comprising configuring a frequency domain resource allocation (FDRA) table associated with the RAR to indicate transmission of the repetitions of the Msg3.

Aspect 24: The method of Aspect 23, wherein the FDRA table indicates transmission of the repetitions of the Msg3 by an index of a starting resource block.

Aspect 25: The method of Aspect 23, wherein the FDRA table indicates a quantity of the repetitions of the Msg3.

Aspect 26: The method of any of Aspects 16-25, wherein the one or more bits configured for the alternative interpretation include modulation coding scheme bits of the RAR.

Aspect 27: The method of any of Aspects 16-26, wherein the one or more bits configured for the alternative interpretation include a reserve bit of the RAR.

Aspect 28: The method of any of Aspects 16-27, wherein the one or more bits configured for the alternative interpretation include a frequency-hopping bit of the RAR.

Aspect 29: The method of Aspect 28, wherein the frequency-hopping bit of the RAR indicates inter-slot frequency-hopping for the repetitions of the Msg3 over multiple slots.

Aspect 30: The method of any of Aspects 16-29, wherein the one or more bits configured for the alternative interpretation include a cellular radio network temporary identifier bit of the RAR.

Aspect 31: A method of wireless communication performed by a user equipment (UE), comprising: transmitting a physical random access channel (PRACH) message associated with transmitting repetitions of an Msg3 for a RACH procedure; receiving a random access response (RAR); and transmitting the repetitions of the Msg3 based at least in part on an alternative interpretation of one or more bitfields of the RAR.

Aspect 32: The method of Aspect 31, wherein the PRACH message implicitly indicates that the UE is capable of using the alternative interpretation.

Aspect 33: The method of Aspect 31 or 32, wherein the PRACH message is transmitted in a PRACH occasion that indicates that the UE is capable of using the alternative interpretation.

Aspect 34: The method of any of Aspects 31-33, wherein transmitting the repetitions of the Msg3 includes transmitting the repetitions of the Msg3 based at least in part on an alternative interpretation of a modulation coding scheme (MCS) bitfield of the RAR.

Aspect 35: The method of Aspect 34, wherein the MCS bitfield indicates an index of an MCS index table.

Aspect 36: The method of Aspect 35, wherein the index indicates repetition.

Aspect 37: The method of Aspect 35 or 36, wherein the index indicates a quantity of repetitions.

Aspect 38: The method of any of Aspects 31-32, wherein transmitting the repetitions of the Msg3 includes transmitting the repetitions of the Msg3 based at least in part on a modulation coding scheme (MCS) table associated with the RAR.

Aspect 39: The method of Aspect 38, wherein the MCS table includes a value that indicates repetition.

Aspect 40: The method of Aspect 38 or 39, wherein the MCS table includes values that each indicate a quantity of repetitions.

Aspect 41: The method of any of Aspects 31-40, wherein transmitting the repetitions of the Msg3 includes transmitting the repetitions of the Msg3 based at least in part on an alternative interpretation of a time domain resource allocation bitfield of the RAR.

Aspect 42: The method of any of Aspects 31-41, wherein transmitting the repetitions of the Msg3 includes transmitting the repetitions of the Msg3 based at least in part on an alternative interpretation of a transmit power control (TPC) bitfield of the RAR or based at least in part on a TPC table associated with the RAR.

Aspect 43: The method of any of Aspects 31-42, wherein transmitting the repetitions of the Msg3 includes transmitting the repetitions of the Msg3 based at least in part on an alternative interpretation of a frequency domain resource allocation bitfield of the RAR.

Aspect 44: The method of any of Aspects 31-43, wherein transmitting the repetitions of the Msg3 includes transmitting the repetitions of the Msg3 based at least in part on an alternative interpretation of a reserve bit of the RAR.

Aspect 45: The method of any of Aspects 31-44, wherein transmitting the repetitions of the Msg3 includes transmitting the repetitions of the Msg3 based at least in part on an alternative interpretation of a frequency-hopping bitfield of the RAR.

Aspect 46: The method of any of Aspects 31-45, wherein transmitting the repetitions of the Msg3 includes transmitting the repetitions of the Msg3 based at least in part on an alternative interpretation of a cellular radio network temporary identifier bitfield of the RAR.

Aspect 47: A method of wireless communication performed by a base station, comprising: receiving, from a user equipment (UE), a physical random access channel (PRACH) message associated with transmitting repetitions of an Msg3 for a RACH procedure; transmitting a random access response (RAR) with one or more bitfields of the RAR configured for an alternative interpretation, by the UE, of the one or more bitfields to determine whether to transmit repetitions of the Msg3, based at least in part on receiving the PRACH message; and receiving the repetitions of the Msg3.

Aspect 48: The method of Aspect 47, further comprising configuring the one or more bitfields for the alternative interpretation based at least in part on the PRACH message including a preamble sequence that indicates that the UE is capable of using the alternative interpretation.

Aspect 49: The method of Aspect 47 or 48, further comprising configuring the one or more bitfields for the alternative interpretation based at least in part on the PRACH message being received in a PRACH occasion that indicates that the UE is capable of using the alternative interpretation.

Aspect 50: The method of any of Aspects 47-49, wherein transmitting the repetitions of the Msg3 includes transmitting the repetitions of the Msg3 based at least in part on an alternative interpretation of a modulation coding scheme (MCS) bitfield of the RAR.

Aspect 51: The method of Aspect 50, wherein the MCS bitfield indicates an index of an MCS index table.

Aspect 52: The method of Aspect 51, wherein the index indicates repetition.

Aspect 53: The method of Aspect 51 or 52, wherein the index indicates a quantity of repetitions.

Aspect 54: The method of any of Aspects 47-53, wherein transmitting the repetitions of the Msg3 includes transmitting the repetitions of the Msg3 based at least in part on a modulation coding scheme (MCS) table associated with the RAR.

Aspect 55: The method of Aspect 54, wherein the MCS table includes values that indicate repetition.

Aspect 56: The method of Aspect 54 or 55, wherein the MCS table includes values that each indicate a quantity of repetitions.

Aspect 57: An apparatus for wireless communication at a device, comprising a processor; memory coupled with the processor; and instructions stored in the memory and executable by the processor to cause the apparatus to perform the method of one or more of Aspects 1-56.

Aspect 58: A device for wireless communication, comprising a memory and one or more processors coupled to the memory, the one or more processors configured to perform the method of one or more of Aspects 1-56.

Aspect 59: An apparatus for wireless communication, comprising at least one means for performing the method of one or more of Aspects 1-56.

Aspect 60: A non-transitory computer-readable medium storing code for wireless communication, the code comprising instructions executable by a processor to perform the method of one or more of Aspects 1-56.

Aspect 61: A non-transitory computer-readable medium storing a set of instructions for wireless communication, the set of instructions comprising one or more instructions that, when executed by one or more processors of a device, cause the device to perform the method of one or more of Aspects 1-56.

As used herein, the term “component” is intended to be broadly construed as hardware and/or a combination of hardware and software. “Software” shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
one or more memories; and
one or more processors coupled to the one or more memories, the one or more processors configured to:
receive, in a radio resource control (RRC) message, a random access configuration associated with a random access channel (RACH) procedure, wherein:
the random access configuration indicates an alternative interpretation of an index value of a modulation coding scheme (MCS) table, and
the alternative interpretation replaces a regular interpretation of the index value;
transmit, based at least in part on the random access configuration, a physical random access channel (PRACH) message that includes a request for transmission of repetitions of an Msg3 for the RACH procedure;
receive a random access response (RAR); and
transmit the repetitions of the Msg3 based at least in part on the alternative interpretation of the index value of the MCS table in one or more bitfields of the RAR, wherein the alternative interpretation is in accordance with the RRC message, and wherein the MCS table includes:
a value that indicates repetition, or
values that each indicate a quantity of repetitions.

2. The UE of claim 1,
wherein the PRACH message implicitly indicates that the UE is capable of using the alternative interpretation.

3. The UE of claim 1,
wherein the PRACH message is transmitted in a PRACH occasion that indicates that the UE is capable of using the alternative interpretation.

4. The UE of claim 1,
wherein the one or more bitfields comprise an MCS bitfield of the RAR.

5. The UE of claim 1,
wherein the index value indicates repetition.

6. The UE of claim 1,
wherein the index value indicates a quantity of repetitions.

7. The UE of claim 1,
wherein the one or more bitfields comprise a time domain resource allocation bitfield of the RAR.

8. The UE of claim 1,
wherein the one or more bitfields comprise a transmit power control (TPC) bitfield of the RAR.

9. The UE of claim 1,
wherein the one or more bitfields comprise a frequency domain resource allocation bitfield of the RAR.

10. The UE of claim 1,
wherein the one or more bitfields comprise a reserve bit of the RAR.

11. The UE of claim 1,
wherein the one or more bitfields comprise a frequency-hopping bitfield of the RAR.

12. The UE of claim 1,
wherein the one or more bitfields comprise a cellular radio network temporary identifier bitfield of the RAR.

13. The UE of claim 1,
wherein the random access configuration includes one or more parameters associated with reception of the RAR.

14. The UE of claim 1,
wherein the random access configuration includes one or more parameters associated with transmission of the PRACH message.

15. A base station for wireless communication, comprising:
one or more memories; and
one or more processors coupled to the one or more memories, the one or more processors configured to:
transmit, in a radio resource control (RRC) message, a random access configuration associated with a random access channel (RACH) procedure, wherein:
the random access configuration indicates an alternative interpretation of an index value of a modulation coding scheme (MCS) table, and the alternative interpretation replaces a regular interpretation of the index value;

receive, from a user equipment (UE) in accordance with the random access configuration, a physical random access channel (PRACH) message that includes a request for transmission of repetitions of an Msg3 for the RACH procedure;

transmit, based at least in part on receiving the PRACH message, a random access response (RAR) with one or more bitfields of the RAR configured for the alternative interpretation, by the UE, of the index value of the MCS table in the one or more bitfields to determine whether to transmit repetitions of the Msg3, based at least in part on receiving the PRACH message, wherein the alternative interpretation is in accordance with the RRC message, and wherein the MCS table includes:

a value that indicates repetition, or values that each indicate a quantity of repetitions; and receive the repetitions of the Msg3.

16. The base station of claim 15, wherein the one or more processors are configured to configure the one or more bitfields for the alternative interpretation based at least in part on the PRACH message including a preamble sequence that indicates that the UE is capable of using the alternative interpretation.

17. The base station of claim 15, wherein the one or more processors are configured to configure the one or more bitfields for the alternative interpretation based at least in part on the PRACH message being received in a PRACH occasion that indicates that the UE is capable of using the alternative interpretation.

18. The base station of claim 15, wherein the one or more bitfields comprise an MCS bitfield of the RAR.

19. The base station of claim 15, wherein the index value indicates repetition.

20. The base station of claim 15, wherein the index value indicates a quantity of repetitions.

21. A method of wireless communication performed by a user equipment (UE), comprising:

receiving, in a radio resource control (RRC) message, a random access configuration associated with a random access channel (RACH) procedure, wherein:

the random access configuration indicates an alternative interpretation of an index value of a modulation coding scheme (MCS) table, and the alternative interpretation replaces a regular interpretation of the index value;

transmitting, based at least in part on the random access configuration, a physical random access channel (PRACH) message that includes a request for transmission of repetitions of an Msg3 for the RACH procedure;

receiving a random access response (RAR); and transmitting the repetitions of the Msg3 based at least in part on the alternative interpretation of the index value of the MCS table in one or more bitfields of the RAR, wherein the alternative interpretation is in accordance with the RRC message, and wherein the MCS table includes:

a value that indicates repetition, or values that each indicate a quantity of repetitions.

22. The method of claim 21, wherein the one or more bitfields comprise an MCS bitfield of the RAR.

23. The method of claim 21, wherein the random access configuration includes one or more parameters associated with reception of the RAR.

24. The method of claim 21, wherein the random access configuration includes one or more parameters associated with transmission of the PRACH message.

25. A method of wireless communication performed by a base station, comprising:

transmitting, in a radio resource control (RRC) message, a random access configuration associated with a random access channel (RACH) procedure;

receiving, from a user equipment (UE) in accordance with the random access configuration, a physical random access channel (PRACH) message that includes a request for transmission of repetitions of an Msg3 for the RACH procedure, wherein:

the random access configuration indicates an alternative interpretation of an index value of a modulation coding scheme (MCS) table, and the alternative interpretation replaces a regular interpretation of the index value;

transmitting, based at least in part on receiving the PRACH message, a random access response (RAR) with one or more bitfields of the RAR configured for the alternative interpretation, by the UE, of the index value of the MCS table in the one or more bitfields to determine whether to transmit repetitions of the Msg3, based at least in part on receiving the PRACH message, wherein the alternative interpretation is in accordance with the RRC message, and wherein the MCS table includes:

a value that indicates repetition, or values that each indicate a quantity of repetitions; and receiving the repetitions of the Msg3.

26. The method of claim 25, wherein the one or more bitfields comprise an MCS bitfield of the RAR.

* * * * *